Feb. 3, 1931. H. H. MAYO 1,791,420
ADJUSTABLE FASTENER
Filed May 24, 1930
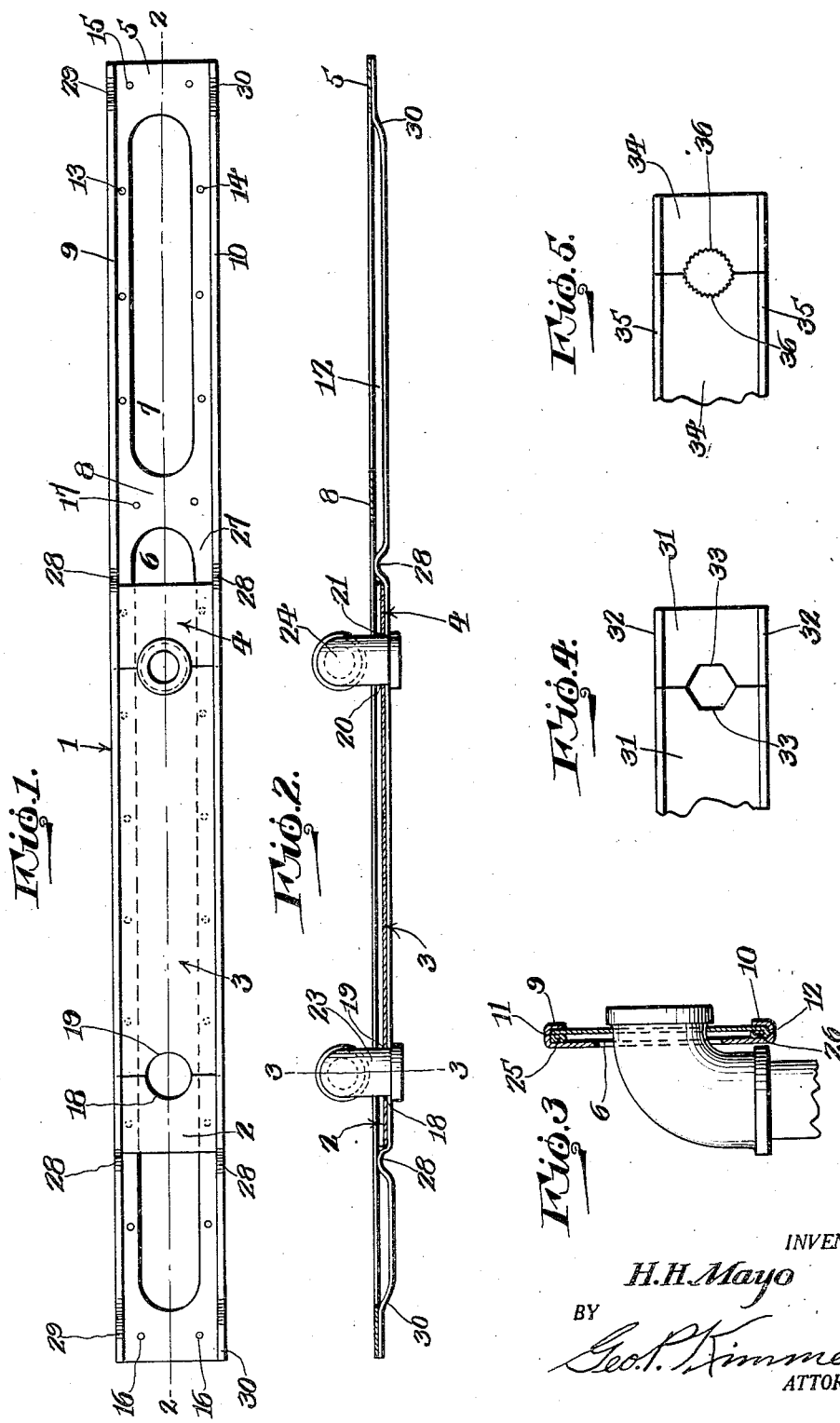

Patented Feb. 3, 1931

1,791,420

UNITED STATES PATENT OFFICE

HERBERT H. MAYO, OF COLUMBUS, GEORGIA

ADJUSTABLE FASTENER

Application filed May 24, 1930. Serial No. 455,338.

This invention relates to an adjustable fastener designed primarily for use in connection with pipe fittings, pipes, conduits, valve bodies and for any other purpose for which it may be found applicable, and the invention has for its object to provide, in a manner as hereinafter set forth, an adjustable fastener device for spacing, levelling and securing pipe fittings, pipes, conduits, valve bodies in the position desired.

Further objects of the invention are to provide, in a manner as hereinafter set forth, an adjustable fastener which is simple in its construction and arrangement, strong, durable, thoroughly efficient in its use, conveniently adjusted, readily assembled, and comparatively inexpensive to manufacture.

With the foregoing and other objects in view the invention consists of the novel construction, combination and arrangement of parts as hereinafter more specifically described, and illustrated in the accompanying drawing wherein is shown an embodiment of the invention, but it is to be understood that changes, variations and modifications can be resorted to which fall within the scope of the claims hereunto appended.

In the drawing wherein like reference characters denote corresponding parts throughout the several views:—

Figure 1 is a front elevation of an adjustable fastener, in accordance with this invention showing the adaptation thereof with respect to a pipe fitting.

Figure 2 is a section on line 2—2, Figure 1 showing the adaptation of the fastener with respect to a pair of pipe fittings.

Figure 3 is a section on line 3—3, Figure 2.

Figures 4 and 5 are fragmentary views in elevation of modified forms of runners.

A fastener in accordance with this invention is designed for nailing or screwing to the face of wooden studs, joists or rafters on frame construction and across chases in masonry or tile construction for the purpose of spacing, levelling and fastening pipe fittings, pipes, conduits or for any other object for which the fastener can be employed in connection with.

The fastener can be of any length and width desired and constructed of any suitable material. The fastener preferably is constructed of sheet metal of any suitable gauge. The elements of the fastener can be constructed in a manner to be used in connection with pipe fittings, pipes, conduits, etc., of any diameter.

The fastener includes a stationary supporting element 1 and a set of runner elements 2, 3 and 4. The runner elements coact to provide for spacing, levelling and securing the fittings, pipes or conduits in the desired position. The runner elements are slidably connected with and supported by element 1. The runner elements are arranged to oppose one face of element 1 and are shiftable relatively to each other in a direction lengthwise with respect to element 1.

The element 1 is designed for nailing or screwing to the face of wooden studs, joists or rafters on frame construction and across chases in masonry or tile construction for the purpose of coupling the runners with such construction to enable the runners to function in a manner to space, level and secure fittings, pipes, conduits, etc., in the desired position with respect to the frame, masonry or tile construction.

The element 1 comprises an oblong body portion 5 of the desired length and width and which is formed with a pair of slots 6, 7 extending lengthwise with respect to said body and spaced by a transverse rib 8. The outer ends of the slots 6, 7 are positioned adjacent the ends of body portion 5. The body portion 5 is bent upon itself lengthwise thereof to form longitudinally extending, oppositely disposed folds 9, 10 which are coextensive with the length of body portion 5. The folds 9, 10 in connection with the remaining part of body portion 5 form oppositely disposed guide channels 11, 12 for the runners 2, 3 and 4 and such folds slidably connect said runners to the body portion 5. The inner free edges of the folds 9, 10 spaced from the side walls of the slots 6, 7. The slot 6 is of materially greater length than the slot 7. The body portion 5 inwardly with respect to the free side edge of fold 9 is formed with a series of openings 13 for the passage of holdfast devices, not shown. The body portion 5 in proximity to the inner side edge of fold 10 is formed with a series of spaced openings 14 for the passage of holdfast devices, not shown. One end of body portion 5 between the folds 9 and 10 is formed with a pair of spaced openings 15 for the passage of holdfast devices, not shown. The other end of body portion 5 is formed with a pair of spaced openings 16 for the passage of holdfast devices, not shown. The rib 8 is provided with a pair of spaced openings 17 for the passage of holdfast devices, not shown. The holdfast devices are adapted to pass through the openings 13, 16 and 17, for fixedly securing the body portion 5 to a frame, masonry or tile construction and maintain such body portion 5 in the desired position. The slots 6 and 7 are provided for the passage of the pipe fittings, pipes, conduits, etc., through the body portion 5.

The runners 2, 3 and 4 coact to space, level and secure the pipe fittings, pipes, conduits, etc., in position and further to couple them with the stationary body portion 5. The said runners 2, 3 and 4 support the pipe fittings, etc., relative to body portion 5. The runners 2 and 4 are of materially less length than the runner 3. The runner 2 is formed from a piece of sheet metal, preferably of rectangular contour and which has its inner side formed with a semi-circular cutout portion. The runner 3 is formed from sheet metal and is of oblong contour and has each end thereof formed with a semi-circular cutout portion. The runner 4 is formed from sheet metal of rectangular contour and has its inner side provided with a semi-circular cutout portion. The cutout portion of runner 2 is indicated at 18. The cutout portions of runner 3 are indicated at 19, 20 and the cutout portion of runner 4 is indicated at 21. The cutout portions 18, 19 coact to provide a circular opening. The cutout portions 20, 21 coact to provide a circular opening. The circular openings are provided for the passage of the fittings 23, 24 as shown in Figure 2. The walls of such circular openings support fittings.

Each runner has positioned on its rear face at the top and bottom thereof a bead and said beads are indicated at 25, 26 and ride against that face of body portion 5 which the runner opposes. The beads 25, 26 are provided for spacing the major part of the runner from the face 27 of the body portion 5 for the purpose of clearing the heads of the holdfast devices which extend through the openings 13, 14, and 17.

After the runners have been arranged at the desired point with respect to the body portion 5 for the purpose of spacing, leveling and securing pipe fittings, pipes, etc., in position the folds are crimped inwardly as indicated at 28 to prevent the shifting of the runners relative to body portion 5 whereby the pipe fittings, pipes, etc., will be maintained in the desired position and supported from body portion 5 by the runners.

The fold 9 at each end and the fold 10 at each end is formed with an inset part which abuts the face 27 of the body portion 5. The manner of setting up the inset parts at the ends of the folds is shown in Figure 2. The inset parts of the fold 9 are indicated at 29 and those on the fold 10 at 30. The inset parts prevent the runners from shifting off of body portion 5 after they have been mounted in the grooves or channels 12. By reference to Figure 4 the runners are not provided with circular cutouts, but polygonal shaped cutouts whereby when two cutouts register with each other a polygonal shaped opening is provided and which provides for the walls of the opening to snugly engage an article of polygonal cross section. Otherwise than that as stated the form shown in Figure 4 is the same as that shown in Figure 1. In Figure 4 the runners are indicated at 31, the beads thereon at 32 and the polygonal cutouts at 33.

The form shown in Figure 5 is the same as that shown in Figure 1, with this exception that the edges of the cutouts formed in the runners are serrated or toothed for the purpose of gripping the pipe fittings, pipes, etc., which extend therethrough. In Figure 5 the runners are indicated at 34, the beads on the runners at 35 and the cutouts, which are of semi-circular contour are indicated at 36.

The openings 15, 16 may also be employed for the passage of holdfast devices to permit of one fastener being coupled to a pair of adjacent fasteners and by this arrangement it will permit of the fastening, levelling and spacing of a group of pipes or fittings such as might occur when plumbing fixtures are placed in batteries.

After the body portion has been secured in position the runners can be adjusted to receive the pipe fittings, pipes, etc., regardless of where they come between the studdings, etc.

The diameter of the openings provided by the runners will be such as to snugly fit the pipe fittings, pipes, conduits, etc., which extend therethrough.

It is thought the many advantages of an adjustable fastener, in accordance with this invention and for the purpose set forth will be readily understood, and although the preferred embodiment of the invention is as illustrated and described, yet it is to be understood that changes in the details of construction can be had which fall within the scope of the invention as claimed.

What I claim is:

1. An adjustable fastener for fittings, pipes and conduits comprising the combination of a supporting element provided with one or more slots and adapted to be anchored in a stationary position, and a set of abutting runners slidably connected with said element to oppose one face of the latter, said runners traversible lengthwise of said element, said runners having cutout parts for coaction when the runners abut to provide spaced openings registering with the slots of said element, said openings providing for the passage of the fittings, pipes and conduits extended through such slots, and said runners coupling the fittings, pipes and conduits to said element in the position desired.

2. An adjustable fastener for fittings, pipes and conduits comprising the combination of a supporting element provided with one or more slots and adapted to be anchored in a stationary position, and a set of abutting runners slidably connected with said element to oppose one face of the latter, said runners traversible lengthwise of said element, said runners having cutout parts for coaction when the runners abut to provide spaced openings registering with the slots of said element, said openings providing for the passage of the fittings, pipes and conduits extended through such slots, said runners coupling the fittings, pipes and conduits to said element in the position desired, said element including bendable means to arrest the shifting of said runners when set in coupling position for the fittings, pipes and conduits.

3. An adjustable fastener for fittings, pipes and conduits comprising the combination of a supporting element provided with one or more slots and adapted to be anchored in a stationary position, and a set of abutting runners slidably connected with said element to oppose one face of the latter, said runners traversible lengthwise of said element, said runners having cutout parts for coaction when the runners abut to provide spaced openings registering with the slots of said element, said openings providing for the passage of the fittings, pipes and conduits extended through such slots, said runners coupling the fittings, pipes and conduits to said element in the position desired, said element provided with openings for the passage of holdfast devices for anchoring it stationary, said runners provided with means for spacing the major portion of the runners clear of the heads of the holdfast devices employed for anchoring the stationary element.

4. An adjustable fastener for fittings, pipes and conduits comprising the combination of a supporting element provided with one or more slots and adapted to be anchored in a stationary position, and a set of abutting runners slidably connected with said element to oppose one face of the latter, said runners traversible lengthwise of said element, said runners having cutout parts for coaction when the runners abut to provide spaced openings registering with the slots of said element, said openings providing for the passage of the fittings, pipes and conduits extended through such slots, said runners coupling the fittings, pipes and conduits to said element in the position desired, said element including bendable means to arrest the shifting of said runners when set in coupling position for the fittings, pipes and conduits, said element provided with openings for the passage of holdfast devices for anchoring it stationary, said runners provided with means for spacing the major portion of the runners clear of the heads of the holdfast devices employed for anchoring the stationary element.

5. An adjustable fastener for levelling, spacing and securing pipe fittings, pipes and conduits comprising the combination of a supporting element provided with one or more slots and adapted to be anchored in a stationary position, said supporting element formed with oppositely extending folds opposing the inner face thereof in spaced relation to provide guide grooves, said folds having inset end portions abutting such face of said element for closing the ends of said grooves, and a set of abutting runners extending into said grooves and having spaced beads on the rear faces thereof riding against such face of said element, said folds slidably connecting said runners to oppose said face of said element, said runners traversible lengthwise of said element, said runners formed with cutout parts for coaction, when the runners abut to provide spaced openings registering with a slot of said element, said openings for the passage of fittings, pipes and conduits extended through a slot of said element whereby such fittings, pipes and conduits are coupled with said element, said folds capable of being inset, intermediate their ends to prevent the shifting of said runners when in coupling position with respect to the fittings, pipes and conduits.

6. An adjustable fastener for levelling, spacing and securing pipe fittings, pipes and conduits comprising the combination of a supporting element provided with one or more slots and adapted to be anchored in a stationary position, said supporting element formed with oppositely extending folds opposing the inner face thereof in spaced relation to provide guide grooves, said folds having inset end portions abutting such face of said element for closing the ends of said grooves, and a set of abutting runners extending into said grooves and having spaced beads on the rear faces thereof riding against said face of said element, said folds slidably connecting said runners to oppose said face of said element, said runners traversible lengthwise of said element, said runners formed with cutout parts for coaction, when the runners abut to provide spaced openings registering with a slot of said element, said openings for the passage of fittings, pipes and conduits extended through a slot of said element whereby such fittings, pipes and conduits are coupled with said element, said folds capable of being inset, intermediate their ends to prevent the shifting of said runners when in coupling position with respect to the fittings, pipes and conduits, said element provided with openings for the passage of holdfast devices for anchoring it in position, said beads spacing the major part of said runners clear of said holdfast devices.

7. An adjustable fastener for the purpose set forth comprising an oblong body portion formed with a pair of lengthwise extending slots spaced by a transverse rib, said body portion formed with a pair of oppositely extending folds opposing one face and extending lengthwise thereof, the major portion of said folds arranged in spaced relation with respect to said face to provide guide grooves, the remaining portion of said folds being inset to abut said face, said body portion provided with openings adjacent the inner side edges of said folds for the passage of holdfast devices to anchor said body portion in position, and a set of abutting runners slidably mounted in said grooves and coupled with said body portion by said folds, said runners provided with spaced beads on their inner faces to space the major portion of the runners clear of the holdfast devices extending through said openings, said runners having cutout parts for coaction, when the runners abut to provide spaced openings registering with one or more slots of said body portion, said runners capable of being adjusted to various points with respect to said face of said body portion, and said folds capable of being inset to arrest shifting movement of the runners when set in the desired position, and said inset parts of said folds abutting said face and providing means to prevent the shifting of the runners from the set off body portion.

In testimony whereof, I affix my signature hereto.

HERBERT H. MAYO.